(12) United States Patent
Friedman

(10) Patent No.: US 9,495,276 B1
(45) Date of Patent: Nov. 15, 2016

(54) INDICATING METRICS ASSOCIATED WITH A MODEL ON A HUMAN MACHINE INTERFACE (HMI)

(75) Inventor: Jonathan H. Friedman, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 1173 days.

(21) Appl. No.: 12/194,894

(22) Filed: Aug. 20, 2008

(51) Int. Cl.
G06F 9/44 (2006.01)
G06F 11/36 (2006.01)

(52) U.S. Cl.
CPC .................................... G06F 11/36 (2013.01)

(58) Field of Classification Search
None
See application file for complete search history.

(56) References Cited

U.S. PATENT DOCUMENTS

| | | | |
|---|---|---|---|
| 7,103,843 B2 * | 9/2006 | Hand et al. ............ | 715/734 |
| 7,441,154 B2 * | 10/2008 | Klotz et al. ............ | 714/39 |
| 7,574,342 B2 * | 8/2009 | Kundert ................ | 703/13 |
| 7,613,599 B2 * | 11/2009 | Bade et al. ............ | 703/14 |
| 7,614,035 B2 * | 11/2009 | DeLine ................. | 717/104 |
| 7,702,427 B1 * | 4/2010 | Sridhar et al. ........ | 701/4 |
| 7,702,754 B2 * | 4/2010 | Dreiling ................ | 709/219 |
| 8,005,812 B1 * | 8/2011 | Mosterman et al. ... | 707/708 |
| 2005/0234884 A1 * | 10/2005 | Drukman et al. ...... | 707/3 |
| 2006/0131415 A1 * | 6/2006 | Irons .................... | 235/454 |
| 2007/0245175 A1 * | 10/2007 | Zheng et al. .......... | 714/57 |
| 2008/0271127 A1 * | 10/2008 | Naibo et al. .......... | 726/6 |
| 2008/0320446 A1 * | 12/2008 | Redpath ................ | 717/118 |
| 2009/0158256 A1 * | 6/2009 | Ponsford et al. ...... | 717/125 |
| 2009/0326853 A1 * | 12/2009 | Chen ..................... | 702/108 |
| 2010/0070968 A1 * | 3/2010 | Poulsen et al. ........ | 717/174 |
| 2010/0146420 A1 * | 6/2010 | Bharadwaj et al. ... | 715/764 |
| 2012/0317532 A1 * | 12/2012 | Caunegre ............... | 716/118 |

OTHER PUBLICATIONS

Google, "Define widget", Dec. 31, 2007, [online][retrieved on Mar. 1, 2006]. Rerieved from <https://www.google.com/search?q=define+widget&source=Int&tbs=cdr%3A1%2Ccd_min%3A2000%2Ccd_max%3A2007&tbm=>.*
"MATLAB 7: Creating Graphical User Interfaces," The MathWorks, Inc., Mar. 2007, pp. v-xvii, 1-1 to 1-6, 2-1 to 2-28, and 4-1 to 4-4.
"Simulink Design Verifier 1: User's Guide," The MathWorks, Inc., Mar. 2007, pp. v-x, and 1-1 to 1-19.
"Report Generator 3: User's Guide," The MathWorks, Inc., Mar. 2007, pp. v-xi, 1-1 to 1-8, and 3-1- to 3-54.
"Simulink Verification and Validation 2: User's Guide," The MathWorks, Inc., Mar. 2007, pp. v-x, 1-1 to 1-5, and 5-5 to 5-59.
"SystemTest 1: User's Guide," The MathWorks, Inc., Mar. 2007, pp. v-viii, 1-1 to 1-46, 2-1 to 2-20, 3-1 to 3-25, and 7-1 to 7-39.
"Simulink 6: Using Simulink," The MathWorks, Inc., Mar. 2007, pp. v-xxvi, 1-1 to 1-47, and 3-1 to 3-166.

(Continued)

*Primary Examiner* — Evral E Bodden
(74) *Attorney, Agent, or Firm* — Cesari and McKenna, LLP; Michael R. Reinemann

(57) ABSTRACT

In an embodiment, a model is analyzed and a metric is generated based on the analysis. An indication of the metric is displayed on a Human Machine Interface (HMI) associated with a model. The analysis may involve executing one or more tests of one or more functions in the model. The metric may be generated based on the executing. The one or more functions may be associated with a widget implemented by the HMI and the indication of the metric may be displayed on the widget. The widget may be coded to indicate the metric.

24 Claims, 10 Drawing Sheets

(56) References Cited

OTHER PUBLICATIONS

"Getting Started with MATLAB 7," The MathWorks, Inc., Mar. 2007, pp. v-x, 1-1 to 1-9, and 6-1 to 6-6.

Chockler, Hana et al., "Coverage Metrics for Formal Verification," International Journal on Software Tools for Technology Transfer, vol. 8, Issue 4, Aug. 2006, pp. 1-15.

Chockler, Hana et al., "Coverage Metrics for Temporal Logic Model Checking," Formal Methods in System Design, vol. 28, Issue 3, May 2006, pp. 1-15.

Fillyaw, Chris et al., "Creating Human Machine Interface (HMI) Based Tests within Model-Based Design," The MathWorks, Inc., Society of Automotive Engineers World Congress, Detroit, MI, Apr. 16, 2007, pp. 1-10.

Fillyaw, Chris et al., "Testing Human Machine Interface (HMI) Rich Designs using Model-Based Design," The MathWorks, Inc., Society of Automotive Engineers World Congress, Detroit, MI, Apr. 14-17, 2008, pp. 1-11.

Okun, Vadim et al., "Issues in Software Testing with Model Checkers," International Conference on Dependable Systems and Networks, Jun. 2003, pp. 1-2.

"Quantum3D Announces DO-178B Level-A Certification Package for IDATA Human Machine Interface Toolset," Quantum3D, Inc., Oct. 31, 2005, pp. 1-2.

Sedigh-Ali, Sahra et al., "Temporal Modeling of Software Test Coverage," IEEE Computer Society, Proceedings of the $26^{th}$ Annual International Computer Software and Applications Conference (COMPSAC'02), 2002, pp. 1-6.

VanDoren, Edmond, "Cyclomatic Complexity: Software Technology Roadmap," Carnegie Mellon Software Engineering Institute, Carnegie Mellon University, Jul. 12, 2000, pp. 1-6.

* cited by examiner

INDICATING METRICS ASSOCIATED WITH A MODEL ON A HUMAN MACHINE INTERFACE (HMI)

BACKGROUND

A human machine interface (HMI) may allow a user to interact with a system in order to, for example, control and assess the state of the system. The system may be a machine, a device, and so on. Control of the system's state may be accommodated by input provisions (e.g., a slider control, input keypad, pushbutton, tuning knob, etc.) provided by the HMI and assessment of the system's state may be accommodated by output provisions (e.g., a display, indicator lamp, etc.) provided by the HMI.

For example, an HMI used to control and assess the state of a radio device may include a tuning knob, several pushbuttons, volume and tone controls, and a display. The tuning knob, pushbuttons, and volume and tone controls may be input provisions provided by the HMI that are configured to control various states associated with the radio device. For example, the tuning knob may be configured to control the operating frequency of the radio device, the pushbuttons may be used to control the radio device's mode of operation (e.g., AM, FM, etc.) and powering the radio device on and off, and the volume and tone controls may be configured to control the sound produced by the radio device (e.g., set volume level, set tone level, etc.). The display may be an output provision provided by the HMI that is configured to provide an assessment of various states associated with the radio device. For example, the display may indicate a mode the radio is operating in (e.g., AM, FM, etc.), whether the device is powered on or off, the volume and tone levels the radio device is set to, the radio's operating frequency, and so on.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
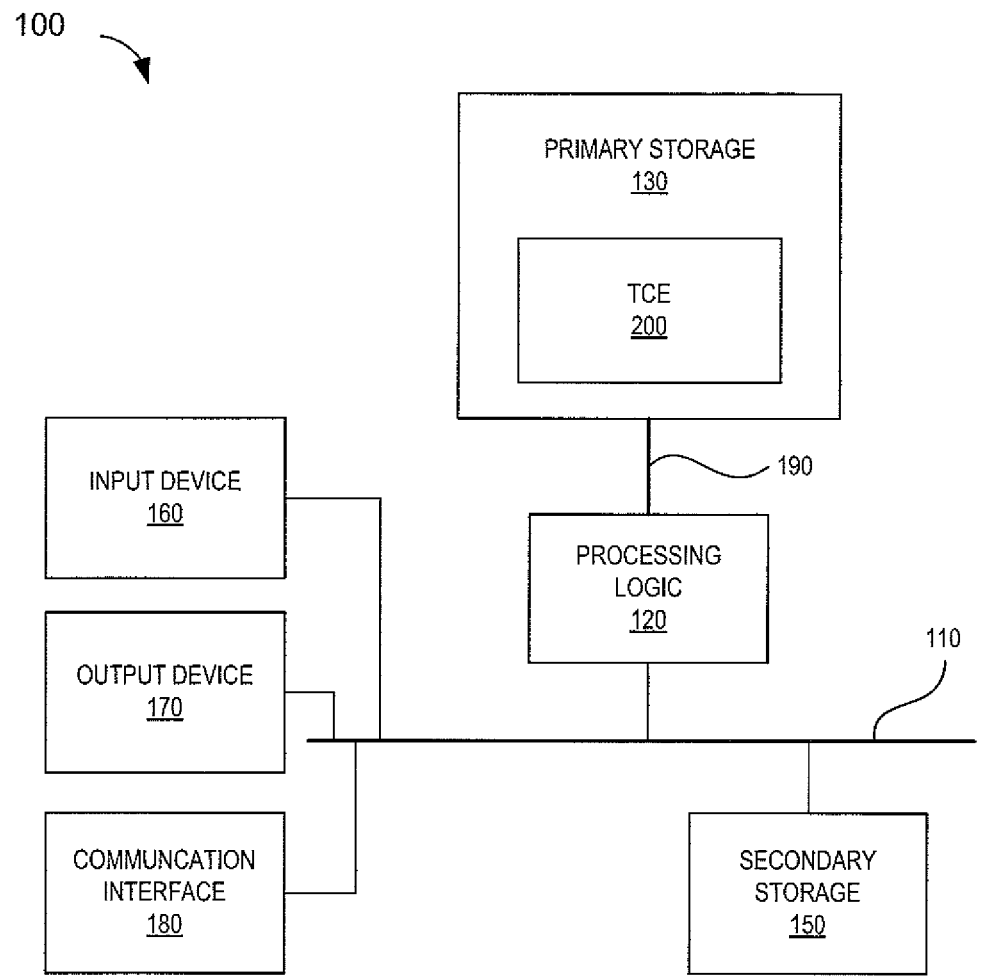
FIG. 1 illustrates an example of a computer system that may be configured to implement one or more embodiments of the invention.

The following detailed description refers to the accompanying drawings. The same reference numbers in different drawings may identify the same or similar elements. Also, the following detailed description does not limit the invention.

Certain technical computing environments (TCEs), such as the Simulink® and MATLAB® environments available from The MathWorks, Inc., Natick, Mass., may be used to generate models that represent systems. The models may be used to help in the design, testing and implementation of the systems. In addition, some TCEs may contain provisions for designing human machine interface (HMIs) associated with the models that may be used to control and assess state, associated with the systems, that is represented by the models. The HMIs may be implemented in software which may include graphics and various software routines. The software routines may be used to interface the HMIs with the models and the graphics may be used to provide a presentation of the HMI on, e.g., a display screen.

Embodiments described herein may include a TCE that a user may use to construct a model, analyze the model, generate one or more metrics based on the analysis, and display an indication of the one or more metrics on an HMI associated with the model. The model may represent a system and may be used by the TCE to simulate the system.

The TCE may include hardware and/or software based logic configured to provide a computing environment that allows the user to perform tasks related to disciplines, such as, but not limited to, mathematics, science, engineering, medicine, business, and so on. The TCE may include a dynamically-typed programming language (e.g., the MATLAB® M-language) that can be used to express problems and/or solutions in mathematical notations. For example, the TCE may use an array as a basic element, where the array may not require dimensioning. These arrays may be used to support array-based programming where an operation can apply to an entire set of values included in the arrays. Array-based programming may allow array-based operations to be treated as a high-level programming technique and may let a user think and operate on whole aggregations of data without having to resort to explicit loops of individual non-array operations, such as scalar operations.

In addition, the TCE may be adapted to perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The TCE may further provide mathematical functions and/or graphical tools or blocks (e.g., for creating plots, surfaces, images, volumetric representations, etc.). The TCE may provide these functions and/or tools using toolboxes (e.g., toolboxes for signal processing, image processing, data plotting, and/or parallel processing). In addition, the technical computing environment may provide these functions as block sets. The TCE may also provide these functions in other ways, such as via a library, remote database, etc.

The TCE may be implemented as a text-based environment, a graphical-based environment, or another type of environment, such as a hybrid environment that includes one or more text-based environments and one or more graphical-based environments. Examples of TCEs may include MATLAB®, Simulink®, Stateflow® software, and SimEvents™ from The MathWorks, Inc.; GNU Octave; Comsol Script and Comsol Multiphysics from Comsol; MATRIXx and LabView® from National Instruments; Mathematica from Wolfram Research, Inc.; Mathcad from Mathsoft Engineering & Education Inc.; Maple from Maplesoft; Extend from Imagine That Inc.; Scilab and Scicos from The French Institution for Research in Computer Science and Control (INRIA); Virtuoso from Cadence; Modelica or Dymola from Dynasim AB; VisSim from Visual Solutions; SoftWIRE by Measurement Computing Corporation; WiT by DALSA Coreco; VEE Pro and SystemVue from Agilent Technologies, Inc.; Vision Program Manager from PPT Vision, Inc.; Khoros from Khoral Research, Inc.; Gedae from Gedae, Inc.; Virtuoso from Cadence Design Systems, Inc.; Rational Rose from International Business Machines (IBM), Inc.; Rhapsody and Tau from Telelogic AB; Ptolemy from the University of California at Berkeley; and aspects of a Unified Modeling Language (UML) or Systems Modeling Language (SysML) environment.

One or more embodiments of the invention may be implemented on a computer system. The computer system may be, for example, a desktop computer, a laptop computer, a client computer, a server computer, a mainframe computer, a personal digital assistant (PDA), a web-enabled cellular telephone, a smart phone, a smart sensor/actuator, or some other another computation and/or communication device.

FIG. 1 illustrates an example of a computer system 100 that may be configured to implement one or more embodiments of the invention. Referring to FIG. 1, the computer system 100 may comprise one or more components including an input-output (I/O) bus 110, processing logic 120, a primary storage 130, a secondary storage 150, an input device 160, an output device 170, a communication interface 180, and a memory bus 190.

The I/O bus 110 may be an interconnect bus configured to enable communication among various components in the computer system 100, such as processing logic 120, secondary storage 150, input device 160, output device 170, and communication interface 180. The communication may include, inter alia, the transfer of data and control information between the components.

The memory bus 190 may be an interconnect bus configured to enable information to be transferred between the processing logic 120 and the primary storage 130. The information may include instructions and/or data that may be executed, manipulated, and/or otherwise processed by processing logic 120.

The processing logic 120 may include logic configured to interpret, execute, and/or otherwise process information contained in, for example, the primary 130 and/or secondary storage 150. The information may include instructions and/or data associated with one or more embodiments of the invention. The processing logic 120 may comprise a single device (e.g., a single core) or a group of devices (e.g., multi-core). Examples of processing logic 120 may include a processor, microprocessor, Field Programmable Gate Array (FPGA), or other types of processing logic that may interpret, execute, manipulate, and/or otherwise process the information The primary storage 130 may comprise one or more computer-readable media configured to store information for processing logic 120. The primary storage 130 may be directly accessible to the processing logic 120 via bus 190. Information stored by primary storage 130 may include one or more computer-executable instructions that are configured to implement TCE 200. The instructions may be executed, interpreted, and/or otherwise processed by processing logic 120. TCE 200 may be a TCE configured to implement one or more embodiments of the invention. An example implementation of TCE 200 will be described further below with respect to FIG. 2.

The primary storage 130 may comprise a random-access memory (RAM) that may include RAM devices. The RAM devices may be volatile or non-volatile and may include, for example, dynamic RAM (DRAM), flash memory, static RAM (SRAM), zero-capacitor RAM (ZRAM), twin transistor RAM (TTRAM), read-only memory (ROM), ferroelectric RAM (FeRAM), magnetoresistive RAM (MRAM), phase change memory RAM (PRAM), etc.

The secondary storage 150 may be a computer-readable media that is indirectly accessible to the processing logic 120. The secondary storage 150 may be configured to store information for processing logic 120. The information may include one or more computer-executable instructions that are executed, interpreted, manipulated, and/or otherwise processed by processing logic 120. The secondary storage 150 may comprise, for example, a storage device, such as a magnetic disk, optical disk, RAM disk, and/or flash drive. The information may be stored on one or more computer-readable media contained in the storage device. Examples of media contained in the storage device may include magnetic discs, optical discs, and memory. The information may include one or more computer-executable instructions that are configured to implement one or more embodiments of the invention.

The input device 160 may include one or more mechanisms that may permit information to be input into the computer system 100. The information may be supplied by a user. The input device 160 may include, for example, a keyboard, mouse, touch sensitive display device, microphone, pen-based pointing device, and/or a biometric input device.

The output device 170 may include one or more mechanisms that may output information from the computer system 100. The output device 170 may include logic that may be directed by, for example, the processing logic 120, to output the information from the computer system 100. The output device 170 may include a printer, a speaker, and/or a display device, which may be configured to present (e.g., display) the information to, for example, a user. The information may be presented on a display, on hardcopy, etc. The display may include a cathode ray tube (CRT), plasma display, light-emitting diode (LED) display, liquid crystal display (LCD), vacuum florescent display (VFD), surface-conduction electron-emitter display (SED), field emission displays (FED), and so on.

The communication interface 180 may include logic configured to interface the computer system 100 with, for example, a network and enable the computer system 100 to communicate with entities connected to the network. An example of a network that may be used with computer system 100 will be described further below with respect to FIG. 10.

The communication interface 180 may include a transceiver-like mechanism that enables the computer system 100 to communicate with the entities connected to the network. The communication interface 180 may be implemented as a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the computer system 100 to the network.

Figure 2:
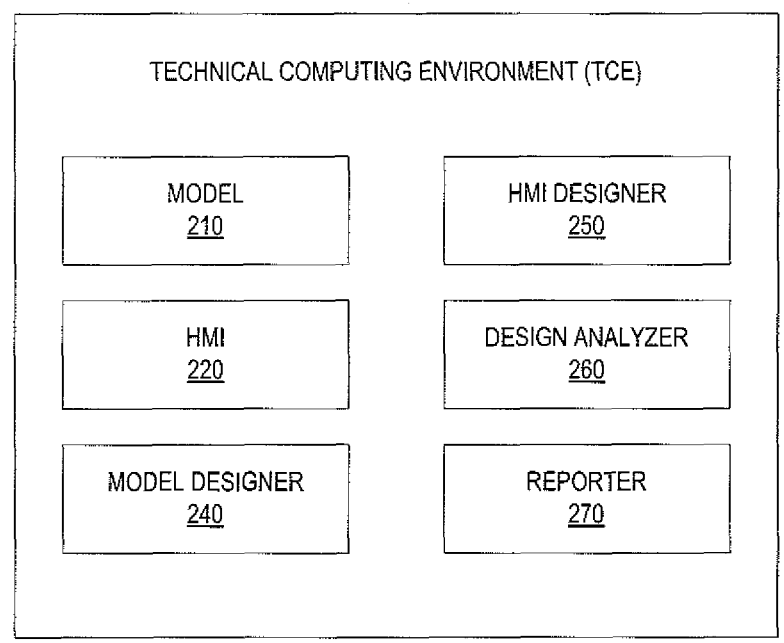
FIG. 2 illustrates an example of a technical computing environment (TCE) that may be configured to implement one or more embodiments of the invention.

FIG. 2 illustrates an example implementation of TCE 200. Referring to FIG. 2, the TCE 200 may comprise various components including model 210, human machine interface (HMI) 220, model designer 240, HMI designer 250, design analyzer 260, and reporter 270. As will be described further below, TCE 200 may be configured to construct model 210, analyze the model 210, generate one or more metrics based on the analysis, and display an indication of the one or more metrics on the HMI 220.

The model 210 may be, for example, a graphical and/or textual model that may be used to model a system in the TCE 200. The system may be a linear or non-linear system. Examples of systems that may be modeled by the model 210 may include audio systems, avionics systems, test and measurement systems, computer-based systems, automotive systems, or other systems that may include HMIs.

The model 210 may be configured to implement one or more functions associated with the system. The functions may be associated with one or more components of the system and, may be configured to implement relationships between the components and behaviors of the components within the modeled system. The functions may be implemented in software that may include code and/or data. The software may be written in a language that may be an imperative language (e.g., C, C++, Java), a dynamically typed language (e.g., MATLAB® M-Code), declarative language, markup language, or some other type of language. The language may be configured to support various programming paradigms, such as imperative programming, declarative programming, or some other programming paradigm. The software may be compiled, interpreted, and/or executed by the TCE 200.

HMI 220 is configured to implement a human machine interface (HMI) for the model 210. HMI 220 may include various input and output provisions that may interface with the model 210 and be used to control and assess, for example, state associated with the model 210. The input and output provisions may be implemented as widgets that may be included in the HMI 220 and displayed when the HMI 220 is displayed. The widgets may include, for example, buttons, sliders, list boxes, spinners, drop-down lists, menus, menu bars, toolbars, ribbons, combo boxes, icons, tree views, grid views, scrollbars, text boxes, combo boxes, labels, tooltips, balloon helps, status bars, progress bars, infobars, windows, modal windows, dialog boxes, palette windows, control knobs, displays, custom designed widgets, and other types of widgets.

The widgets may be displayed by an output device, such as output device 170. HMI 220 may include one or more images (e.g., bitmap images, JPEG images, etc.) that may be used to depict the widgets on the output device. The widgets may be associated with one or more functions that are implemented by model 210.

Software that is configured to interface the widgets with the model 210 may be provided. The software may include callback routines, data structures (e.g., handles), and so on. The software may be compiled, interpreted, and/or executed by the TCE 200.

The model designer 240 may be configured to create and/or modify model 210. In addition, the model designer 240 may be configured to use the model 210 to simulate and/or analyze dynamic systems represented by the model 210. The systems may be simulated by the model designer 240 in continuous time, sampled time, or a hybrid of the two. The model designer 240 may contain a graphical and/or a textual interface that may be used to create and/or modify the model 210. The graphical interface may allow the model 210 to be constructed by arranging blocks that may represent functionality and/or data associated with the system. The model designer 240 may be further configured to execute and/or interpret the model 210 in order to simulate the system represented by the model 210. Examples of TCE's that contain model designers that may be used with embodiments of the invention are MATLAB® and Simulink®, both of which are available from The MathWorks, Inc., Natick, Mass.

The model designer 240 may include a verifier that is configured to verify aspects of the model 210. Specifically, the verifier may be configured to generate one or more tests that may be used to test functions implemented by the model 210, prove properties that are specified in the model 210, identify examples of property violations in the model 210, detect unreachable design elements in the model 210 (e.g., inaccessible subsystems, illegal switch conditions, and unachievable states), and produce detailed reports regarding test case generation and property proofs. An example of a verifier that may be used with embodiments of the invention is the Simulink® Design Verifier™ which is available from The MathWorks, Inc.

The HMI designer 250 may be configured to create and/or modify HMI 220. The HMI designer 250 may contain provisions for generating widgets and software (e.g., callback routines, handles) for the HMI 220 that are used to implement aspects of the interface provided by HMI 220. The provisions may be implemented as tools that may be used to design HMI 220. For example, the HMI designer 250 may include a layout editor that enables a user to specify widgets associated with HMI 220. The user may specify the widgets by clicking and dragging the widgets from a palette into a layout area. In addition, the layout editor may allow the user to specify, for example, code and/or data structures associated with the widgets, a tab order of the widgets, icons, and so on. Other tools provided by the HMI designer 250 may include a property inspector that may be used to specify properties of the HMI 220, an object browser that may be used to display objects associated with the HMI 220, and a toolbar editor that may be used to generate toolbars for the HMI 220. An example of an HMI designer that may be used with embodiments of the invention is the Graphical User Interface Development Environment (GUIDE), which is part of MATLAB®.

The design analyzer 260 may be configured to perform an analysis of the model 210 and generate a metric based on the analysis. The analysis may include a verification of the model 210. The metric may represent coverage of the model 210, complexity of the model 210, or some other aspect of the model 210 that may be measured by the analysis.

Types of coverage that may be represented in the metric may be, for example, test coverage, decision coverage, condition coverage, modified coverage/decision coverage (MC/DC), lookup table coverage, and/or signal range coverage. The test coverage may include coverage associated with tests that may be, for example, executed to test portions of the model 210.

The test coverage may represent a percentage of test coverage provided by the tests where the percentage reflects, for example, a percentage of the model 210 that is tested (covered) by the tests. The decision coverage may include coverage associated with decision points in the model 210. The decision coverage may cover, for example, switch constructs (e.g., a switch block) and states related to the switch constructs contained in the model 210. The condition coverage may include coverage associated with portions of the model 210 that output a logical combination of their inputs. The MC/DC coverage may include coverage associated with whether inputs in the model 210 are changed by various outputs of the model 210. The lookup table coverage may include coverage associated with frequency of usage of interpolation intervals associated with the model 210 (e.g., the coverage may represent whether a test for the model 210 achieves full coverage if it executes each interpolation and extrapolation interval at least once). Signal range coverage may include coverage associated with indicating minimum and/or maximum values generated for outputs of the model 210 during a simulation of the model 210.

The complexity of the model 210 may include a cyclomatic complexity that measures a structural complexity of the model 210 and/or code that is generated from the model 210. The complexity may approximate a McCabe complexity measure for the model 210 and/or the generated code.

The reporter 270 may be configured to display an indication of the generated metric on the HMI 220. The indication may be displayed on a portion (e.g., a widget) of the HMI's display. The portion of the HMI's display may be coded to indicate the metric. The coding may include, for example, coloring, shading, highlighting, blinking, flashing, changing font, changing width, displaying text, or some other coding technique of the portion of the HMI's display.

In addition, the reporter 270 may display information associated with the model 210. This information may include, for example, a statechart, hierarchical depiction, sequence diagram, tabular diagram, flow chart, data flow diagram, finite state machine, activity diagram, program code listings, a time flow diagram, source code, or other information associated with the model 210.

In examples described herein, model 210 may be configured to implement an audio system and the HMI 220 may be configured to implement an interface for the audio system. It should be noted, however, that model 210 and HMI 220 may be configured to implement other systems and HMIs, respectively.

As noted above, HMI 220 may be displayed by an output device, such as output device 170. HMI 220 may contain one or more widgets that may be displayed and may be associated with input and output provisions provided by HMI 220.

Figure 3:
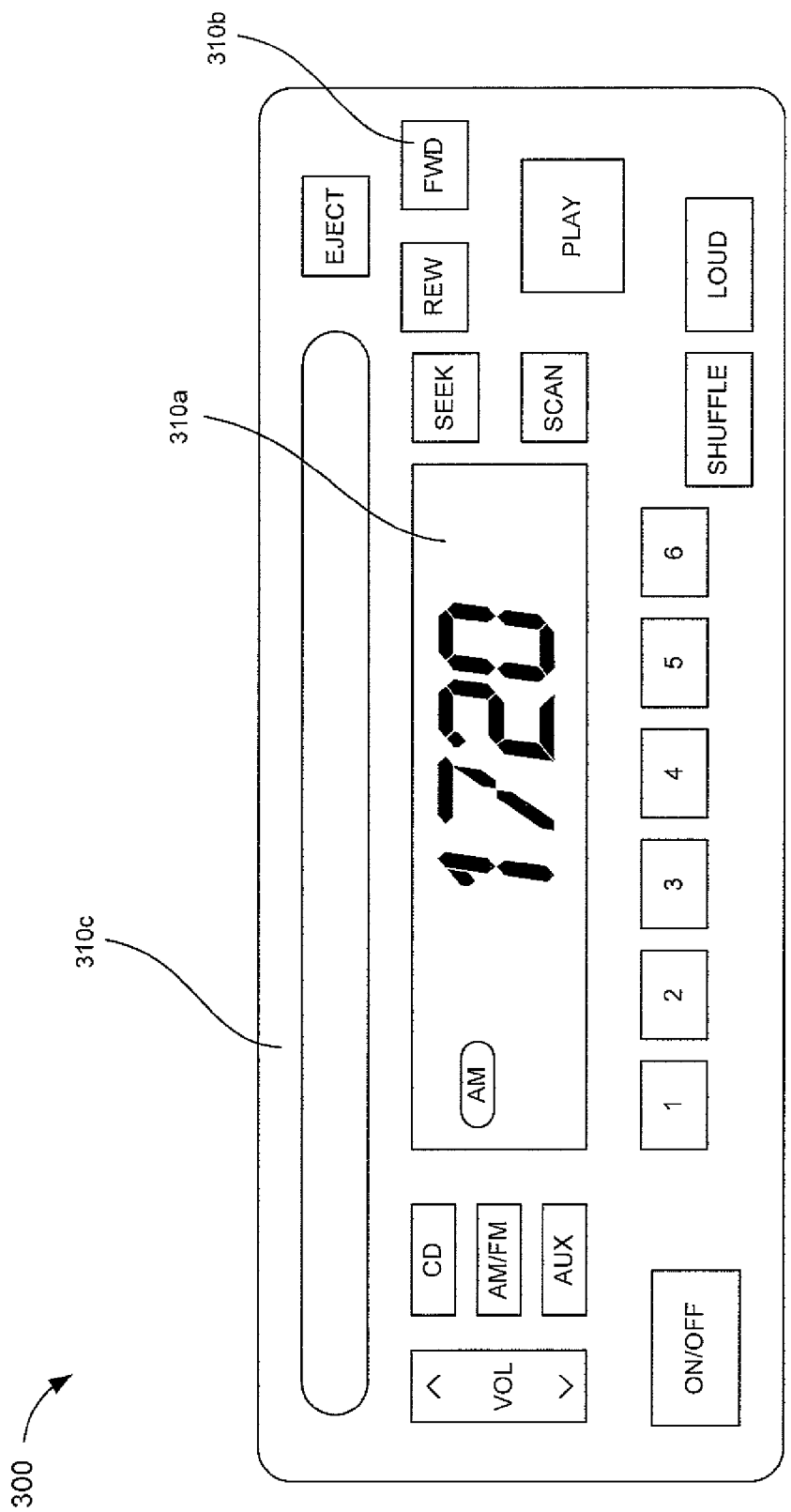
FIG. 3 illustrates an example display of a human machine interface (HMI)

FIG. 3 illustrates an example display 300 of HMI 220. In this example, model 210 may be configured to implement an audio system that includes a radio and a Compact Disc (CD) player. The HMI 220 may be configured to implement an HMI for the audio system. The display 300 may be a depiction of the interface implemented by HMI 220.

Referring to FIG. 3, the display 300 may contain one or more widgets 310, which are part of the HMI 220 and may be used to control and/or assess the state of the audio system. For example, widget 310a may be configured to implement a display (e.g., liquid crystal display (LCD), light-emitting diode (LED) display, etc.) for the audio system that may be used by the model 210 to indicate a mode in which the audio system is operating (e.g., AM, FM, CD, auxiliary (AUX)) and information associated with the mode (e.g., an operating frequency of the audio system's radio, a track number of a CD disc being played by the audio system's CD player, etc.). Widget 310b may be configured to implement a fast-forward pushbutton that may be used to advance the audio system's CD player to a next track when the audio system is in a CD mode. Widget 310c may be configured to implement a backplate for the HMI 220.

As will be described further below, a metric that is generated based on an analysis of a model may be displayed on a portion of an HMI associated with the model. The portion may be coded to indicate the metric. The coding may include, for example, coloring, shading, highlighting, blinking, and/or flashing the portion; changing a font or width of text in the portion; bolding text in the portion; adding text to the portion; or some other form of coding.

For example, model 210 may be configured to implement one or more functions that are associated with widget 310b. The analysis may involve executing one or more tests to test the one or more functions. A metric may be generated based on the executing. The metric may be a percentage of test coverage of the one or more functions that is provided by the one or more tests. Widget 310b may be coded to indicate the metric. The coding may include color coding where, for example, different colors may be used to indicate different levels of test coverage.

Information associated with a model may be displayed in a graphic that is not part of an HMI's display. The graphic may be a pop-up graphic (e.g., popup window, popup bubble), a graphic that is continually displayed (e.g., fixed window) or some other type of graphic. The information may include, for example, a statechart, hierarchical depiction, sequence diagram, tabular diagram, flow chart, data flow diagram, finite state machine, activity diagram, program code listings, a time flow diagram, or other information that may be relevant to the model. The information may be displayed in response to a widget being selected and the information may relate to the analysis of functions provided by the model that are associated with the widget. The information may be coded, as described above, to indicate a metric associated with the analysis of the model.

Figure 4:
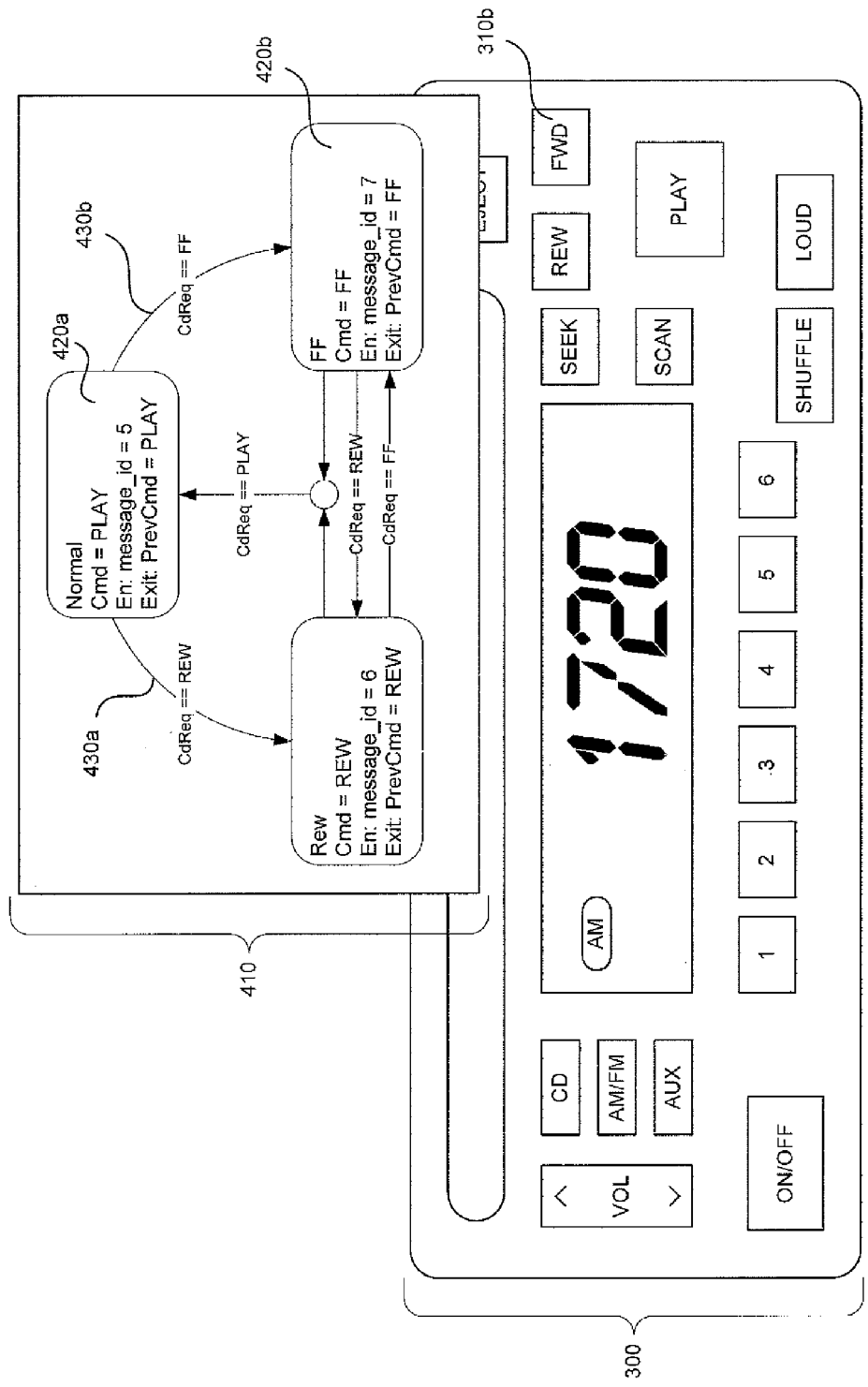
FIG. 4 illustrates an example display of an HMI and a statechart depicting information associated with a widget displayed in the display.

FIG. 4 illustrates an example display 300 of HMI 220 and a statechart depicting information associated with widget 310b. Referring to FIG. 4, the statechart 410 includes one or more state blocks, such as blocks 420a-b, and one or more edges, such as edges 430a-b. The state blocks represent states and the edges represent state transitions implemented by model 220. For example, blocks 420a and 420b represent a play (PLAY) state and a fast-forward (FF) state, respectively, that are implemented by model 210. The state transition represented by edge 430b represents a transition from the play state to the fast-forward state. This transition may be taken, for example, when model 210 is in the play state and the FWD button 310b is pushed twice successively within a certain time period. Taking the transition causes model 210 to enter the fast-forward state.

States and transitions depicted in state diagram 410 may be associated with one or more functions implemented by model 210. The functions may be implemented in software. The software may be analyzed and a metric may be generated based on the analysis. The metric may be indicated in the statechart by coding the statechart to indicate the metric.

For example, the fast-forward state represented by state block 420b may be associated with one or more functions implemented by model 210 that are implemented in software. The software may be analyzed and a metric may be generated from the analysis. The analysis may include performing a complexity analysis of the software to identify a degree of complexity of the software. The metric may be generated based on the identified degree of complexity. In state diagram 410, state block 420*b* may be coded, as described above, to indicate the metric. The coding may include, for example, coloring the state block 420*b* certain colors depending on the degree of complexity that is represented by the metric.

Figure 5:
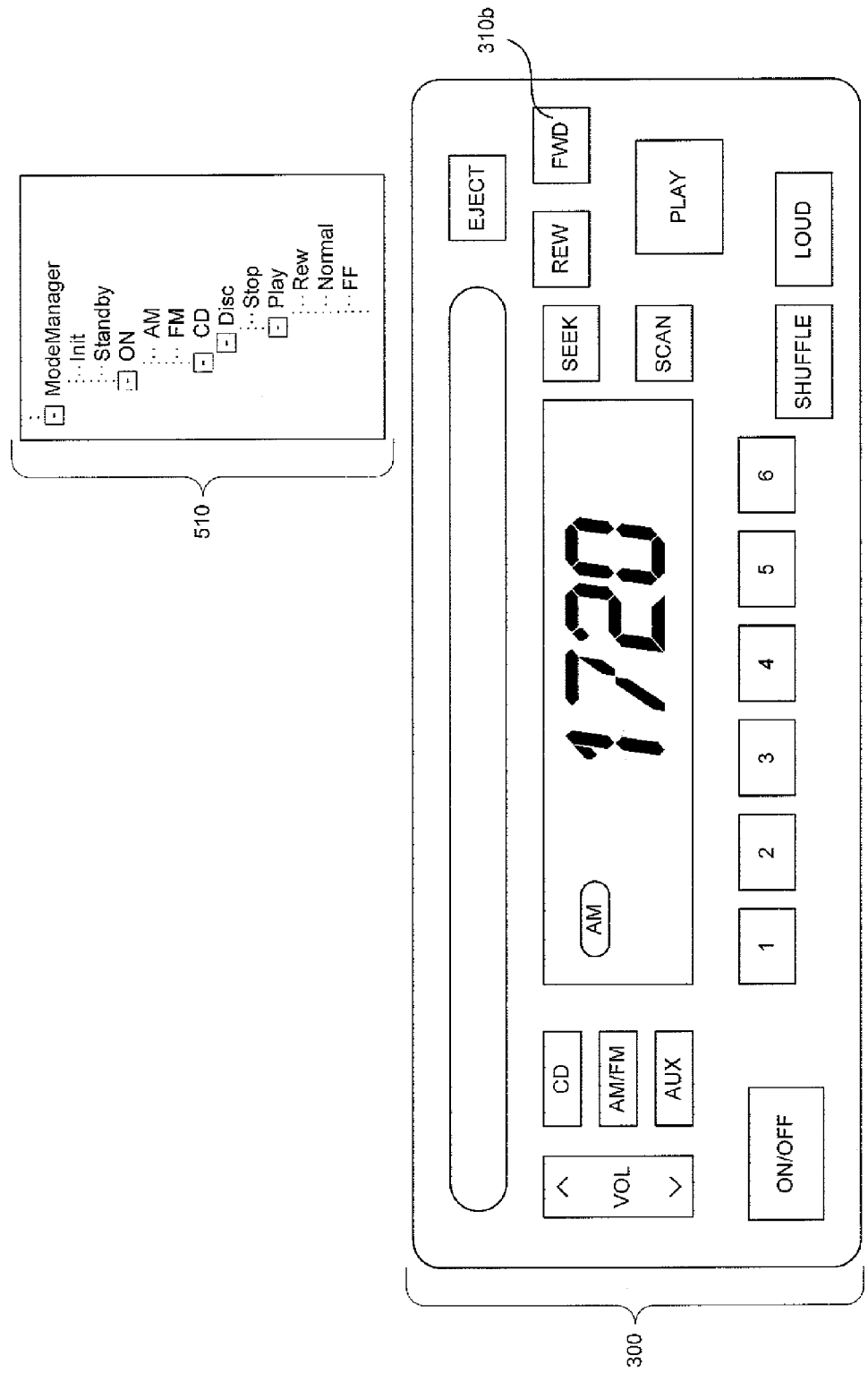
FIG. 5 illustrates an example display of an HMI and a hierarchical depiction of information associated with a widget displayed in the display.

FIG. 5 illustrates an example display 300 of HMI 220 and a hierarchical depiction of information 510 associated with widget 310*b* displayed in the display. Referring to FIG. 5, the hierarchical depiction of information 510 includes a hierarchical depiction of one or more functions implemented by the model 210 that may be associated with widget 310*b*. For example, the function named "FF" is a fast-forward (FF) function provided by the model 210 that is associated with widget 310*b*. The function may be performed if widget 310*b* is selected multiple times within a prescribed time period.

The hierarchical depiction of information 510 may provide an indication of where and when a particular function may be reached in the overall model 210. For example, hierarchical depiction of information 510 indicates that the FF function may be reached from a play function of the CD player when the audio system is turned on, the CD mode is selected, a disc is present in the CD player, and the disc is being played.

The hierarchical depiction of information 510 may be displayed in response to selecting widget 310*b*. The widget 310*b* may be selected, for example, by positioning a mouse cursor over the widget 310*b*, clicking on the widget 310*b* with a mouse, using a series of keyboard commands, etc.

Information listed in the hierarchical depiction of information 510 may be coded to indicate a metric that is generated based on an analysis of functions listed in the hierarchical depiction 510. For example, the fast-forward function may be analyzed and a metric may be generated from the analysis. The analysis may include identifying a complexity of the fast-forward function. The text "FF" in the hierarchical information 510 may be coded to indicate the metric generated from the analysis. The metric may include a metric that represents the identified complexity. The coding may include, for example, coloring, shading, highlighting, blinking, flashing, bolding the text; changing the text's font; changing the text's width; or some other coding technique to indicate the metric.

Figure 6:
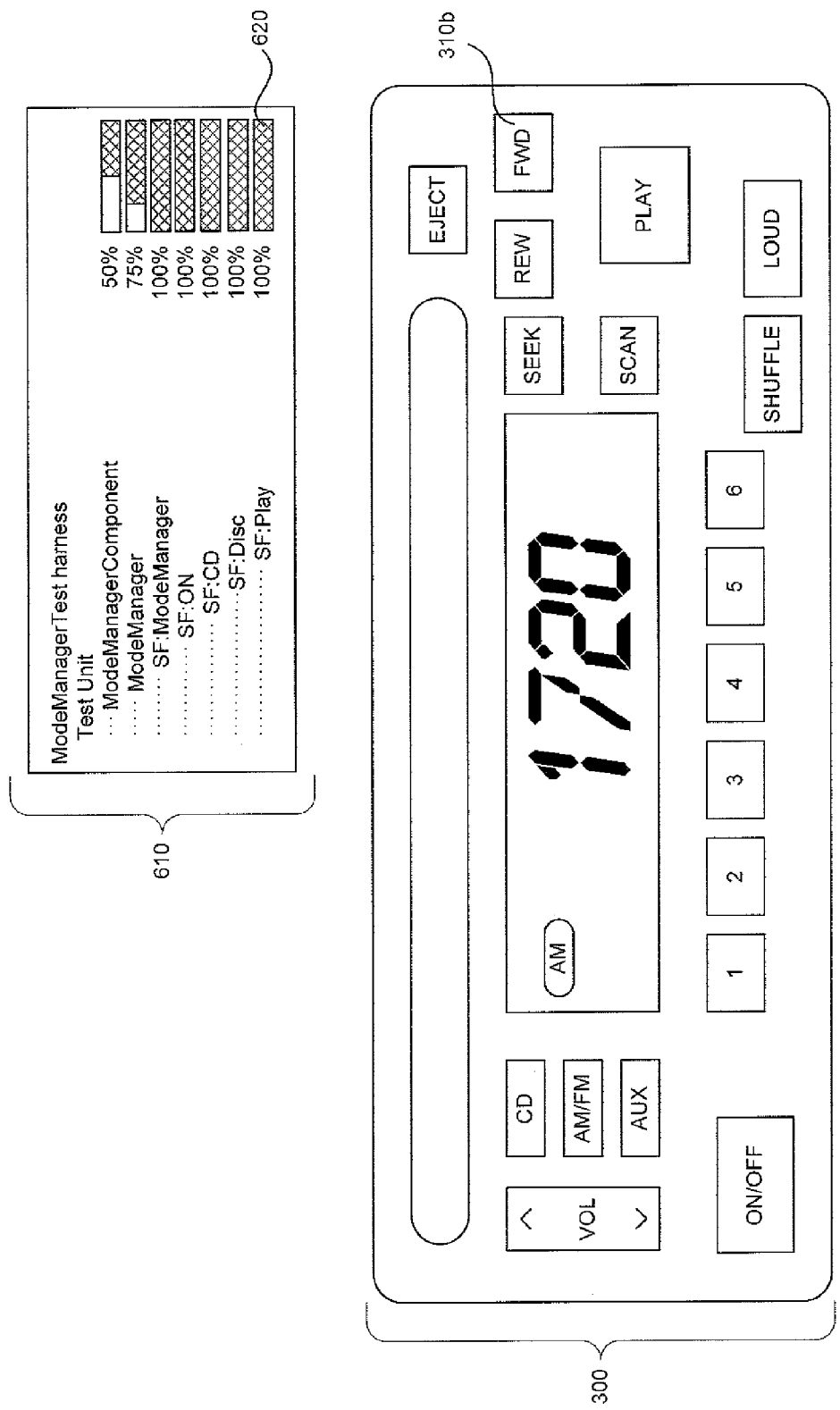
FIG. 6 illustrates an example display of an HMI and another hierarchical depiction of information associated with a widget displayed in the display.

FIG. 6 illustrates an example display 300 of HMI 220 and another hierarchical depiction 610 of information associated with widget 310*b*. Referring to FIG. 6, the hierarchical depiction 610 depicts functions associated with widget 310*b* in a hierarchical arrangement. In addition, a percentage of test coverage associated with the functions is also depicted. The test coverage may be determined by executing one or more tests to test the functions and measuring the percentage of test coverage of the functions provided by the one or more tests. Alternatively, the analysis may include analyzing the tests to determine a level of test coverage provided by the tests and generating the percentage of test coverage based on the analysis. The percentage of test coverage for a particular function may be indicated in the hierarchical display using, for example, text and/or graphics.

For example, the functions listed in hierarchical depiction 610 may be implemented in software. The software may be analyzed including executing one or more tests to test the software. Paths in the software that are covered by the tests may be marked during the course of executing the tests. A number of marked paths in the software and a total number of paths in the software may be identified. A percentage of test coverage of the functions that is provided by the tests may be identified based on the identified number of marked paths and total number of paths. The identified percentage of test coverage may be indicated in the hierarchical depiction 610 as a bar graph, such as bar graph 620. In addition, names of functions listed in the hierarchical depiction 610 may be coded, as described above, to indicate a percentage of test coverage of those functions.

Figure 7:
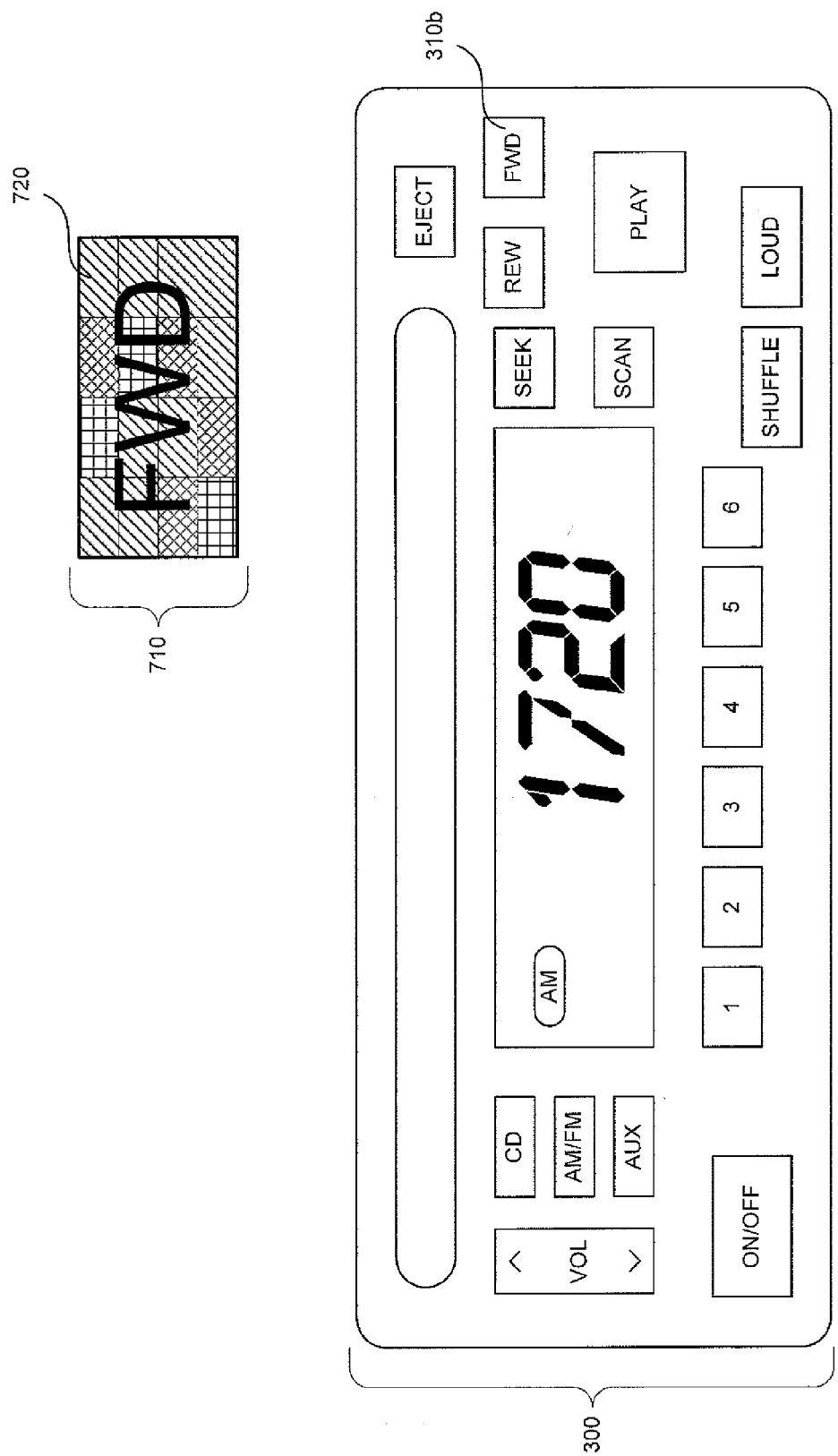
FIG. 7 illustrates an example display of an HMI and an aggregate display that may be used to indicate one or more metrics associated with a widget displayed in the display.

In some cases, one or more metrics may be generated for a widget. For example, a widget may be associated with multiple functions implemented by a model and separate metrics may be generated for each function or groups of functions associated with the widget. Here, the metrics may be indicated in an aggregate display. FIG. 7 illustrates an example display 300 of HMI 220 and an aggregate display 710 that may be used to indicate one or more metrics that may be generated based on an analysis of functions associated with widget 310*b*.

Referring to FIG. 7, the aggregate display 710 may be divided into a series of sections wherein a section may indicate a metric or a group of metrics that are generated based on an analysis of a model. For example, model 210 may be configured to implement multiple functions that are associated with widget 310*b*. The functions may be analyzed and metrics may be generated for each function or group of functions. The aggregate display 710 may indicate the generated metrics where each section may indicate a particular metric or group of metrics. Thus, for example, section 720 may be coded to indicate a metric or group of metrics that are generated as a result of analyzing a particular function or a group of functions that are associated with widget 310*b*.

In some instances, an analysis may involve analyzing one or more functions implemented by the model 210 that are not associated with any widgets implemented by the HMI. Here, an indication of a metric that may be generated based on the analysis of the functions may, nevertheless, still be displayed on the HMI.

For example, an indication of a metric that is generated based on an analysis of one or more functions implemented by model 210 that are not associated with any widget implemented by HMI 220 may be displayed on HMI 220 in widget 310*c* which, as noted above, is configured to implement a backplate for the HMI 220. The widget 310*c* may be coded, as described above, to indicate the metric.

Figure 8:
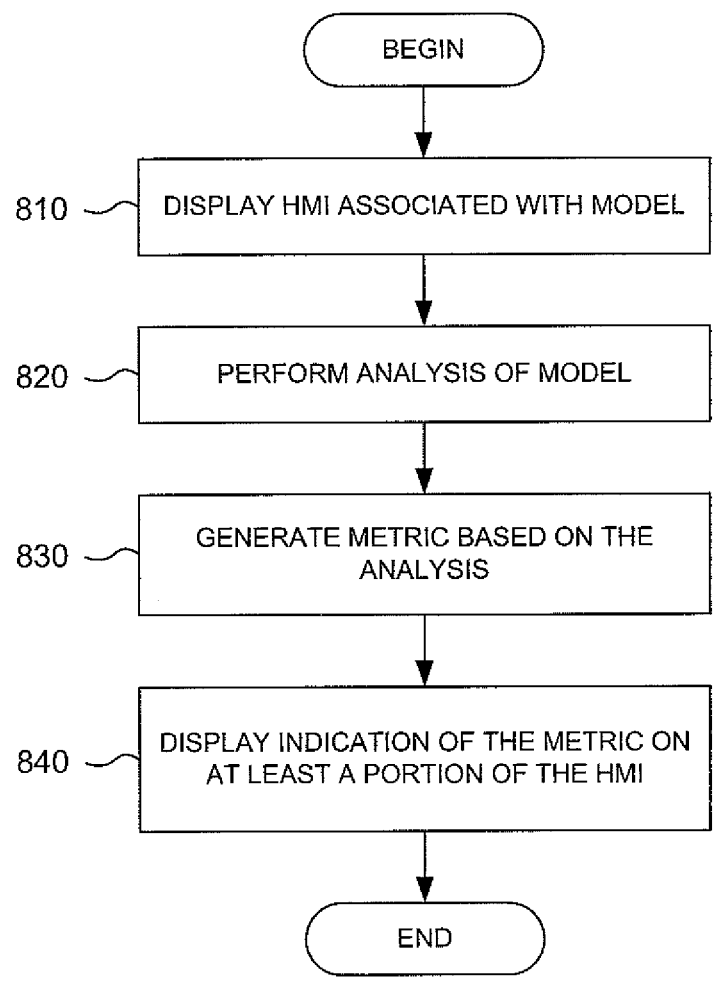
FIG. 8 is a flow chart illustrating an example of acts that may be used to analyze a model, generate a metric based on the analysis and display an indication of the metric on a display of an HMI associated with the model.

FIG. 8 is a flow chart illustrating an example of acts that may be used to perform an analysis of a model, generate a metric based on the analysis and display an indication of the metric on an HMI associated with a model.

Referring to FIG. 8, at block 810, the HMI is displayed. The HMI may be displayed on an output device, such as output device 170. At block 820 an analysis of the model is performed. The analysis may include analyzing one or more functions implemented by the model, as described above. The functions may or may not be associated with one or more widgets implemented by the HMI. The functions may be implemented using software and the analysis may include testing the software using one or more tests, identifying a percentage of test coverage provided by the one or more tests, identifying a complexity of the software, and so on.

At block 830, a metric is generated based on the analysis performed at block 820. The metric may represent, for example, the identified percentage of test coverage, the identified complexity of the model, and so on.

At block 840, an indication of the generated metric is displayed on at least a portion of an HMI associated with the model. For example, a portion of an HMI associated with a model may be a widget implemented by the HMI. The indication may be displayed on the widget and the widget may be coded to indicate the metric, as described above.

For example, referring to FIGS. 1, 2, 3, and 8, in an embodiment, model 210 may model an audio system, HMI 220 may be configured to implement an interface to the audio system, and display 300 (FIG. 3) may be a depiction of HMI 220, as described above. Widget 310*b* may be associated with one or more functions implemented by the model 210. Processing logic 120 may direct output device 170 to display the HMI 220 (block 810). The one or more functions associated with widget 310*b* may be analyzed (block 820) to identify a coverage of the functions that is provided by one or more tests, identify a complexity of the functions, and so on. A metric may be generated based on the analysis (block 830). The metric may represent the identified coverage, the identified complexity, and so on, depending on the analysis performed at block 820. Processing logic 120 may direct output device 170 to display an indication of the metric on widget 310*b* (block 840). Widget 310*b* may be coded, as described above, to indicate the metric.

Figure 9:
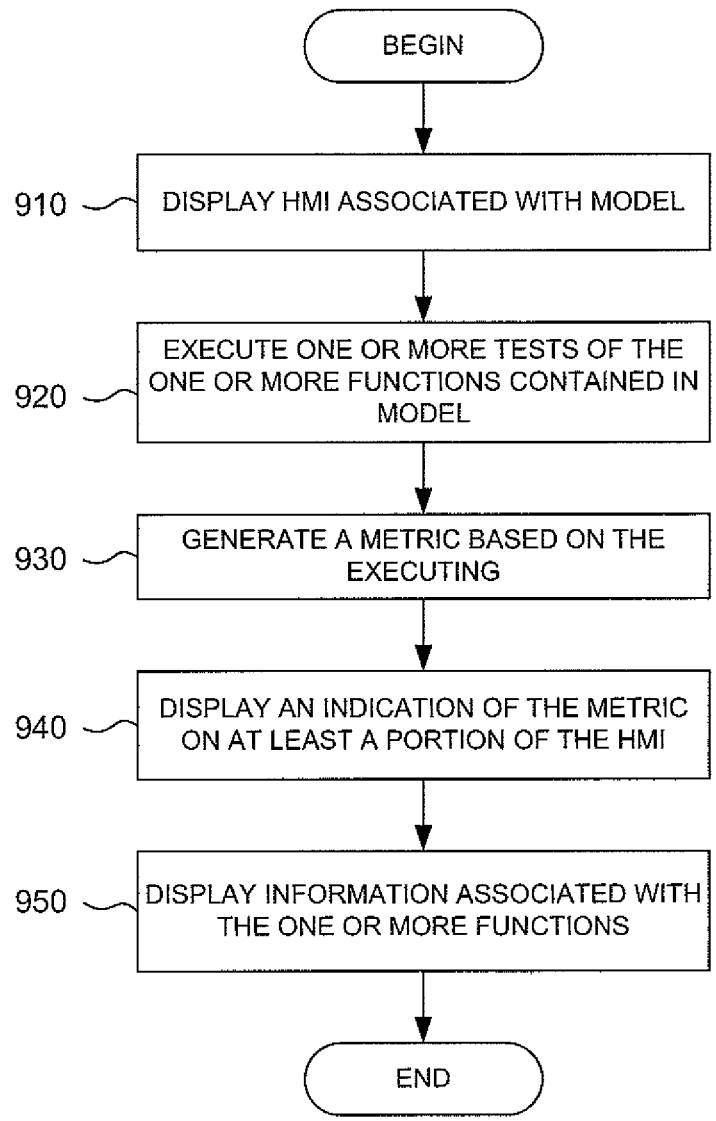
FIG. 9 is a flow chart illustrating an example of acts that may be used to generate a metric related to testing one or more functions implemented by a model, display an indication of the metric on an HMI associated with the model, and display information associated with the one or more functions.

FIG. 9 is a flow chart illustrating an example of acts that may be used to generate a metric related to testing one or more functions implemented by a model, display an indication of the metric on an HMI, and display information associated with the one or more functions.

Referring to FIG. 9, at block 910, an HMI associated with the model is displayed. At block 920, one or more tests are executed to test the one or more functions implemented by the model. The functions may be implemented, for example, in software and the tests may be configured to test paths in the software. Paths that are covered by the tests may be marked, as described above, to indicate the tests have covered that portion of the software.

At block 930, a metric is generated based on the executing performed at block 920. The metric may reflect, for example, a coverage of the functions provided by the tests. The coverage may include a percentage of test coverage of the functions that is provided by the tests or some other coverage. For functions that are implemented in software, paths in the software may be marked, as described above and the percentage may be determined by identifying a number of paths that are marked, identifying a number of total paths in the software, and generating the percentage based on the identified number of marked paths and the identified number of total paths.

At block 940, an indication of the metric is displayed on at least a portion of the HMI. As noted above, the indication may include coding a widget in the HMI's display to indicate the metric. At block 950, information associated with the one or more functions is displayed. As noted above, this information may include for example, a statechart, hierarchical depiction, sequence diagram, tabular diagram, flow chart, data flow diagram, finite state machine, activity diagram, program code listings, a time flow diagram, source code, or other information related to the functions.

For example, referring to FIGS. 1, 2, 4, and 9, in an embodiment, model 210 is configured to implement a model of an audio system, HMI 220 is configured to implement an interface for the audio system, and display 300 is a display of HMI 220. Model 210 may be designed using the model designer 240 and HMI 220 may be designed using the HMI designer 250. The model designer 240 may direct output device 170 to display the HMI 220 (block 910). The model designer 240 may generate one or more tests to test software configured to implement functions that are implemented by the model 210. The functions may be associated with widget 310*b*.

The design analyzer 260 may execute the tests to test paths in the software and generate a metric based on the execution of the tests (block 920). Execution of the tests may involve marking paths in the software that are covered by the tests and leaving paths that are not tested by the tests unmarked. The design analyzer 260 may identify the number of marked paths by examining the paths and tallying the number of paths that have been marked during execution. In addition, the design analyzer 260 may identify the total number of paths by examining the paths and tallying the number of both marked and unmarked paths. The design analyzer 260 may then identify a percentage of test coverage provided by the tests based on the number of marked paths and the total number of paths. The design analyzer 260 may then generate the metric based on the identified percentage of test coverage (block 930).

The reporter 270 may display an indication of the metric on the HMI 220 (block 940). The indication may be displayed on widget 310*b*, which as noted above is part of HMI 220. The reporter 270 may code the widget 310*b* to indicate the metric, as described above. In addition, the reporter 270 may display statechart 410. The statechart 410 may be displayed in response to selecting widget 310*b*.

Figure 10:
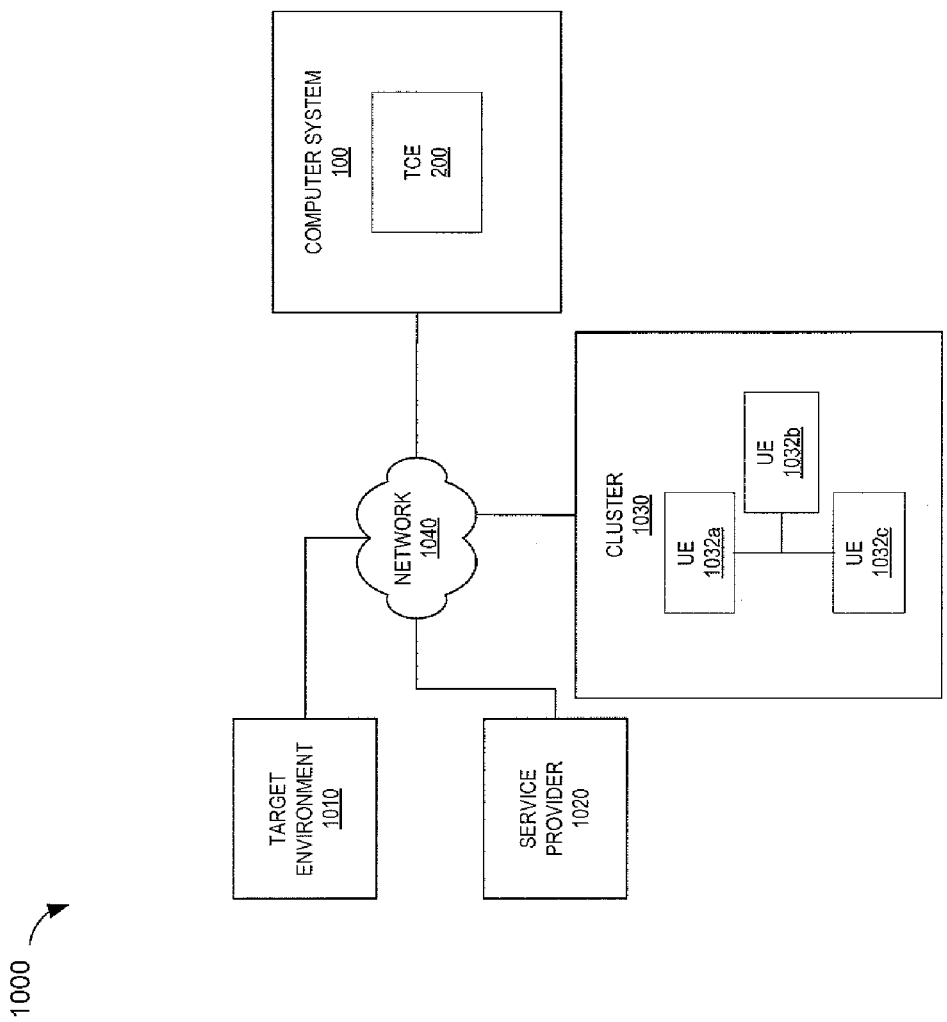
FIG. 10 illustrates an example of a distributed environment that may be configured to implement one or more embodiments of the invention.

FIG. 10 illustrates an example of a distributed environment 1000 that may be configured to implement one or more embodiments of the invention. Referring to FIG. 10, environment 1000 may contain various entities including computer system 100, target environment 1010, service provider 1020, cluster 1030, and network 1040. Note that the distributed environment illustrated in FIG. 10 is just one example of an environment that may be used with embodiments of the invention. Other distributed environments that may be used with embodiments of the invention may contain more entities, fewer entities, entities in arrangements that differ from the arrangement illustrated in FIG. 10, and so on.

Details of computer system 100 were described above with respect to FIG. 1. In distributed environment 1000, computer system 100 may be configured to, inter alia, exchange information (e.g., data) with another entity (e.g., target environment 1010, service provider 1020, and cluster 1030) in network 1040. Computer system 100 may interface with the network 1040 via communication interface 180.

The network 1040 may be a communication network capable of exchanging information between the entities in the network 1040. The network 1040 may be digital and/or analog based. The information may include machine-readable information having a format that may be adapted for use, for example, in the network 1040 and/or with one or more entities in the network 1040. For example, the information may be encapsulated in packets that may contain one or more addresses (e.g., source addresses, destination addresses, etc.) that may be used to transfer the information through the network 1040.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

The network 1040 may comprise various network devices, such as gateways, routers, switches, firewalls, servers, address translators, etc. Portions of the network 1040 may be wired (e.g., using wired conductors, optical fibers, etc.) and/or wireless (e.g., using free-space optical (FSO), radio frequency (RF), acoustic transmission paths, etc.). Portions of network 1040 may include a substantially open public network, such as the Internet. Portions of the network 1040 may include a more restricted network, such as a private corporate network. It should be noted that implementations of networks and/or devices operating on networks described herein are not limited with regards to information carried by the networks, protocols used in the networks, the architecture/configuration of the networks, etc.

The service provider 1020 may include logic (e.g., software) that makes a service available to another entity in the distributed environment 1000. The service provider 1020 may include a server operated by, for example, an individual, a corporation, an educational institution, a government agency, and so on, that provides one or more services to a destination, such as computer system 100. The services may include software containing computer-executable instructions that may be executed, in whole or in part, by a destination, by the service provider 1020 on behalf of the destination, or some combination thereof.

For example, in an embodiment, service provider 1020 may provide one or more subscription-based services that may be available to various customers. One or more of the services may be configured to implement one or more embodiments of the invention. The services may be accessed by a customer via network 1040. The customer may access the services using a computer system, such as computer system 100. The service provider 1020 may limit access to certain services based on, e.g., a service agreement between the customer and the service provider 1020.

The service agreement may allow the customer to access the services and allow the customer to build and/or execute a model, such as model 210. In addition, the service agreement may allow the customer to access one or more services that may be configured to implement one or more embodiments of the invention. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Cluster 1030 may include a number of units of execution (UEs) 1032 that may perform processing on behalf of computer system 100 and/or another entity, such as service provider 1020. For example, in an embodiment, cluster 1030 may parallel process model 210. This parallel processing may include processing model 210 in accordance with one or more embodiments of the invention.

The UEs 1032 may reside on a single device or chip or on multiple devices or chips. For example, the UEs 1032 may be implemented in a single application specific integrated circuit (ASIC) or in multiple ASICs. Likewise, the UEs 1032 may be implemented in a single computer system or multiple computer systems. Other examples of UEs 1032 may include field programmable gate arrays (FPGAs), complex programmable logic devices (CPLDs), application specific instruction-set processors (ASIPs), microprocessors, etc.

The UEs 1032 may be configured to perform operations on behalf of another entity. For example, in an embodiment, the UEs 1032 are configured to execute portions of code associated with the TCE 200. Here, the TCE 200 may dispatch certain activities pertaining to parallel processing activities to the UEs 1032 for execution. In another embodiment, the service provider 1020 may configure cluster 1030 to provide, for example, interactive model design capabilities to computer system 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described with regards to FIGS. 8 and 9, the order of the acts may be modified in other implementations. Further, non-dependent acts may be performed in parallel.

Also, the term "user", as used herein, is intended to be broadly interpreted to include, for example, a computer system (e.g., a workstation) or a user of a computer system, unless otherwise stated.

It will be apparent that embodiments, described herein, may be implemented in many different forms of software and hardware in the implementations illustrated in the figures. Software code and/or specialized hardware used to implement embodiments described herein is not limiting of the invention. Thus, the operation and behavior of the embodiments were described without reference to the specific software code and/or specialized hardware—it being understood that one would be able to design software and/or hardware to implement the embodiments based on the description herein.

Portions of the invention may be implemented as "logic" that performs one or more functions. This logic may include hardware, such as an application specific integrated circuit or a field programmable gate array, software, or a combination of hardware and software. The logic may be encoded in one or more executable media and may include instructions for execution by processing logic, such as processing logic 120.

It should be noted that one or more embodiments of the invention may be implemented using some combination of hardware and/or software. It should be further noted that one or more computer-readable media may store computer-executable instructions that when executed by processing logic, such as processing logic 120, may perform various acts associated with one or more embodiments of the invention. The computer-readable media may be volatile or non-volatile and may include, for example, flash memories, removable disks, non-removable disks, and so on.

It should be further noted that various electromagnetic signals, such as wireless signals, electrical signals carried over a wire, optical signals carried over optical fiber, etc., may be encoded to carry computer-executable instructions, configured to implement one or more embodiments of the invention on a network, such as, for example, network 1040.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more non-transitory computer-readable media storing executable instructions for execution by processing logic, the media storing one or more instructions for:

storing, in a memory, an executable design model, the executable design model including one or more testable functions;

displaying a Human Machine Interface (HMI), the HMI being associated with the executable design model and including one or more widgets for controlling the one or more testable functions included in the executable design model;

automatically analyzing, by a processor coupled to the memory, the one or more testable functions of the executable design model;

verifying the executable design model based on the analyzing, the verifying including:
  performing coverage testing of the one or more testable functions of the executable design model, or
  performing complexity testing of the one or more testable functions of the executable design model;

generating a testing metric representing a result of the coverage testing or the complexity testing of the one or more testable functions of the executable model; and displaying, by the processor, an indication of the testing metric on at least a portion of the HMI associated with the executable design model, where the one or more widgets are coded to include a visual indicator that represents the testing metric.

2. The non-transitory computer-readable media of claim 1 wherein the automatically analyzing further comprises:
  executing one or more tests of the one or more testable functions, and
  wherein the testing metric indicates a coverage of the one or more testable functions that is provided by the one or more tests.

3. The non-transitory computer-readable media of claim 2 wherein the coverage includes at least one of a modified condition/decision coverage (MC/DC), a decision coverage, a lookup table coverage, a signal range coverage, and a percentage of test coverage.

4. The non-transitory computer-readable media of claim 1 wherein the testing metric indicates a complexity of the one or more testable functions.

5. The non-transitory computer-readable media of claim 4 wherein the complexity is a cyclomatic complexity.

6. The non-transitory computer-readable media of claim 1 wherein the coding includes at least one of color, shading, highlighting, blinking, flashing, font change, width change, and text.

7. The non-transitory computer-readable media of claim 1 further comprising one or more instructions for:
  displaying information associated with the one or more testable functions.

8. The non-transitory computer-readable media of claim 7 wherein the information is displayed in at least one of a pop-up graphic and a window that is separate from the HMI.

9. The non-transitory computer-readable media of claim 7 wherein the HMI includes a first widget of the one or more widgets, and the information is displayed in response to selecting the first widget.

10. The non-transitory computer-readable media of claim 7 wherein the information includes at least one of a statechart, a hierarchical depiction, a sequence diagram, a tabular diagram, a flow chart, a data flow diagram, a finite state machine representation, an activity diagram, and a time flow diagram.

11. The non-transitory computer-readable media of claim 7 wherein at least a portion of the information is coded to indicate the testing metric.

12. The non-transitory computer-readable media of claim 7 wherein the information is displayed in response to a portion of the HMI being selected.

13. A computer-implemented method comprising:
  storing, in a memory, an executable design model including one or more testable functions;
  displaying a Human Machine Interface (HMI), the HMI being associated with the executable design model and including one or more widgets for controlling the one or more testable functions included in the executable design model;
  executing, by a processor coupled to the memory, one or more tests of the one or more testable functions of the executable design model, where the one or more tests include a verification of the executable design model, to identify at least one of a coverage and a complexity of the one or more testable functions of the executable design model;
  generating a testing metric representing a result of the at least one of a coverage and a complexity of the one or more testable functions of the executable design model; and
  displaying, by the processor, an indication of the testing metric on the HMI associated with the executable design model, wherein the one or more widgets are coded to include a visual indicator that represents the testing metric.

14. The computer-implemented method of claim 13 wherein the testing metric indicates the coverage of the one or more testable functions that is provided by the one or more tests.

15. The computer-implemented method of claim 13 further comprising one or more instructions for:
  displaying information associated with the one or more testable functions.

16. The computer-implemented method of claim 15 wherein the HMI includes a first widget of the one or more widgets and the information is displayed in response to selecting the first widget.

17. The computer-implemented method of claim 15 wherein at least a portion of the information is coded to indicate the testing metric.

18. A system comprising:
  a memory storing an executable design model including a plurality of testable functions;
  a display device that displays a Human Machine Interface (HMI) being associated with the executable design model, and including one or more widgets for controlling the plurality of testable functions included in the executable design model; and
  processing logic, coupled to the memory and the display device, the processing logic configured to:
    instruct the display device to display the HMI,
    execute one or more tests of one or more testable functions of the plurality of testable functions implemented by the executable design model, where the one or more tests include a verification of the executable design model, to identify at least one of a coverage and a complexity of the one or more testable functions of the plurality of testable functions,
    generate a testing metric representing a result of the at least one of a coverage and a complexity of the one or more testable functions of the plurality of testable functions, and
    instruct the display device to display an indication of the testing metric on at least a portion of the HMI associated with the executable design model, where the one or more widgets are coded to include a visual indicator that represents the testing metric.

19. The system of claim 18 wherein the processing logic is further configured to:

instruct the display device to display information associated with the one or more testable functions.

20. An apparatus comprising:

means for storing an executable design model including a plurality of testable functions;

means for displaying a Human Machine Interface (HMI), the HMI being associated with the executable design model and including one or more widgets for controlling the plurality of testable functions included in the executable design model, means for identifying a testing metric associated with one or more tests for the plurality of testable functions, the identifying means including a verification of the executable design model, the testing metric representing a result of at least one of a coverage testing and a complexity testing of the plurality of testable functions; and means for displaying an indication of the testing metric on at least a portion of the HMI associated with the executable design model, where the one or more widgets are coded to include a visual indicator that represents the testing metric.

21. One or more non-transitory computer-readable media storing executable instructions for execution by processing logic, the media storing one or more instructions for:

storing, in a memory an executable design model including a plurality of testable functions;

displaying a human machine interface (HMI), the HMI being associated with the executable design model and including one or more widgets for controlling the plurality of testable functions included in the executable design model;

performing one or more tests on the plurality of testable functions of the executable design model to identify a percentage of test coverage of the plurality of testable functions provided by the one or more tests; and displaying, by a processor coupled to the memory, an indication of the identified percentage of test coverage on at least a portion of the HMI associated with the executable design model, where the one or more widgets are coded to include a visual indicator that represents the identified percentage of test coverage.

22. One or more non-transitory computer-readable media storing executable instructions for execution by processing logic, the media storing one or more instructions for:

storing, in a memory, a model-based design application program that constructs, an executable design model including one or more testable functions;

displaying, within the model-based design application program, a human machine interface (HMI) including one or more widgets controlling the one or more testable functions included in the executable design model;

automatically performing, by a processor coupled to the memory, an analysis of the executable design model;

verifying the executable design model based on the automatically performing the analysis, the verifying including:

performing coverage testing of the executable design model, or performing complexity testing of the executable design model;

generating a testing metric representing a result based on the performing the coverage testing or the complexity testing; and displaying, within the model-based design application program, by the processor, an indication of the testing metric on the HMI associated with the executable design model, where the one or more widgets are coded to include a visual indicator that represents the testing metric.

23. The one or more non-transitory computer-readable media of claim 22 wherein the one or more instructions for performing an analysis of the executable design model comprise one or more instructions for:

executing one or more tests to test one or more portions of the executable design model, and wherein the testing metric represents a percentage of test coverage of the one or more portions that is provided by the one or more tests.

24. The one or more non-transitory computer-readable media of claim 22 wherein the one or more instructions for performing an analysis of the executable design model comprise one or more instructions for:

identifying a complexity of the executable design model, and wherein the testing metric represents the identified complexity.

* * * * *